United States Patent
Ding et al.

(10) Patent No.: US 10,167,395 B1
(45) Date of Patent: Jan. 1, 2019

(54) ANTI-FOULING AND ANTI-CORROSION AGENT FOR MARINE STEEL STRUCTURE SURFACE AND PREPARATION METHOD THEREOF

(71) Applicant: Zhejiang University of Technology, Hangzhou (CN)

(72) Inventors: Yuting Ding, Hangzhou (CN); Dong Lin, Hangzhou (CN); Yanbo Wang, Hangzhou (CN); Long Lin, Hangzhou (CN); Xuxia Zhou, Hangzhou (CN)

(73) Assignee: ZHEJIANG UNIVERSITY OF TECHNOLOGY, Hangzhou (CN)

( * ) Notice: Subject to any disclaimer, the term of this patent is extended or adjusted under 35 U.S.C. 154(b) by 0 days.

(21) Appl. No.: 15/955,718

(22) Filed: Apr. 18, 2018

(30) Foreign Application Priority Data

Nov. 30, 2017 (CN) .......................... 2017 1 1232565

(51) Int. Cl.
| | | |
|---|---|---|
| *C09D 151/08* | (2006.01) |
| *C09D 5/16* | (2006.01) |
| *C09D 7/65* | (2018.01) |
| *C09D 175/08* | (2006.01) |
| *C09D 5/08* | (2006.01) |

(52) U.S. Cl.
CPC ............. *C09D 5/1662* (2013.01); *C09D 5/08* (2013.01); *C09D 7/65* (2018.01); *C09D 175/08* (2013.01)

(58) Field of Classification Search
CPC ...... C09D 5/1662; C09D 7/65; C09D 175/08; C09D 5/08; C98D 5/08
USPC .......................................................... 524/424
See application file for complete search history.

*Primary Examiner* — Josephine L Chang
(74) *Attorney, Agent, or Firm* — Perkins Coie LLP

(57) ABSTRACT

The present invention provides an anti-fouling and anti-corrosion agent for the marine steel structure surface and preparation method thereof. The emulsion is made of raw materials at the following mass ratios: 1100 to 1500 parts of a polyurethane monomer, 1000 parts of polyether glycol, 200 to 400 parts of an alcohol chain extender, 100 to 250 parts of a hydrophilic chain extender, 200 to 400 parts of epoxy resin polyols, 100 to 150 parts of triethylamine, 400 to 1000 parts of an acrylate monomer, 1000 to 1500 parts of a graphene oxide-protamine composite emulsion, and 5 to 20 parts of an initiator. The solvent-free and composite film-forming resin emulsion of the present invention has both anti-fouling and anti-corrosion functions, which applies to a production of a green and environmental marine coating and protects the marine steel structure surface to prevent from organism attachment and sea water corrosion.

8 Claims, No Drawings

ANTI-FOULING AND ANTI-CORROSION AGENT FOR MARINE STEEL STRUCTURE SURFACE AND PREPARATION METHOD THEREOF

CROSS-REFERENCE TO RELATED APPLICATIONS

This Non-provisional application claims priority under 35 U.S.C. § 119(a) on Patent Application No(s). 201711232565.2 filed in China on Nov. 30, 2017, the entire contents of which are hereby incorporated by reference.

BACKGROUND OF THE INVENTION

Field of the Invention

The present invention relates to a green biological anti-fouling and anti-corrosion agent (composite resin), which not only can prevent adhesion and attachment of organisms (microorganisms, shellfish and so on) on a steel structure surface, but also can prevent corrosion.

Description of the Related Art

A marine environment is a complex corrosive environment. Chemical and biological media in sea water, and a physical movement of seawater and marine atmosphere cause a great damage to the steel structure. Marine corrosion starts from the steel structure surface, and local corrosions such as galvanic corrosion, pitting corrosion, crevice corrosion and so on occur in a relatively small area. Marine corrosion has brought a huge loss to national economic construction, and seriously threatened the safety of marine engineering construction and usage. With the deepening and expanding of marine development in the future, a challenge of new corrosion problem will be continuously faced.

In addition, the corrosive damage encountered in sea water is often closely associated with the organism attachment fouling. After the steel structure immersing in a sea surface, the surface forms a covering layer of bacterial mucous, microorganism mucous and large attachment organisms successively. These attached organisms and metabolic products will accelerate the corrosion directly or indirectly, which results in a reduction of steel structural strength, and forms security risks. What's more, marine organisms attached to a facility surface in the sea increases weight and cumbersomeness of a marine mining platform facility, increases navigational resistance of a ship, blocks a pipeline and aquaculture cage, and affects normal use of equipment such as a marine monitoring instruments and so on, leading to a huge loss of a marine military activities, marine transportation, industry and aquaculture production.

At present, for problems of seawater corrosion and organism attachment, the coatings is usually sprayed on the steel structure surface, and a protective film is formed by using the film-forming resin of the coating to isolate the sea water corrosion. Using hydrolysis, diffusion or exudation and other means of a toxic substance in the coating, poisons are released to kill marine organisms gradually, which achieves a purpose of prevent the organism attachment. The conventional anti-corrosion coatings have defects in properties such as waterproofing, adhesion strength, salt resistance, marine climate resistance and so on, and cannot effectively protect the steel structure surface from sea water corrosion. Due to an addition of large amounts of organotin, cuprous chloride, DDT and other marine harmful substances, the anti-fouling coating has a serious impact on growth and reproduction of marine organisms after contacting with sea water, which endangers the marine environment seriously. After the regulation of completely banning organotin anti-fouling coatings became effective in January 2008, the development of marine dyed coatings gradually developed towards no-tin, low toxicity and water-based. Therefore, it is very necessary to study and develop a kind of the film-forming resin with both anti-corrosion and anti-fouling functions applying in the marine coating production.

BRIEF SUMMARY OF THE INVENTION

The objective of the present invention is to solve the deficiencies of toxicity, poor service performance, short service life of existing conventional anti-fouling and anti-corrosion coatings. Through a formula design, the present invention prepares a solvent-free and composite film-forming resin emulsion, which is applied to the marine coating production with both anti-fouling and anti-corrosion functions, and provides a green organism anti-attachment and anti-corrosion method for the anti-fouling and anti-corrosion for the marine steel structure surface.

A technical solution adopted by the present invention is:

The present invention provides a solvent-free and composite film-forming resin emulsion, and the emulsion is made of raw materials at the following mass ratios: 1100 to 1500 parts by weight of a polyurethane monomer (prefer toluene diisocyanate), 1000 parts by weight of polyether glycol (prefer polyether diol having a molecular weight of 2000), 200 to 400 parts by weight of an alcohol chain extender, 100 to 250 parts by weight of a hydrophilic chain extender, 200 to 400 parts by weight of epoxy resin polyols, 100 to 150 parts by weight of triethylamine, 400 to 1000 parts by weight of an acrylate monomer, 1000 to 1500 parts by weight of a graphene oxide-protamine composite emulsion, and 5 to 20 parts by weight of an initiator. The described alcohol chain extender is ethylene glycol, 1,2-propanediol, 1,4-butanediol or neopentyl glycol.

The described hydrophilic chain extender is a dimethylolpropionic acid or a dimethylolbutanoic acid.

The described epoxy resin polyols is made by refluxing and mixing an epoxy resin (prefer bisphenol A epoxy resin with epoxy value equal to 0.44) and diethylamine at a mass ratio of 100:25 to 100:50.

The described graphene oxide-protamine composite emulsion is made of a mixture of raw materials at the following mass ratio: 1 to 15 parts by weight of graphene oxide, 1000 to 2000 parts by weight of a protamine emulsion, 10 to 50 parts by weight of a glutaraldehyde aqueous solution at a mass concentration of 50%, and 5 to 25 parts by weight of concentrated sulfuric acid at a mass concentration of 98%.

The described protamine emulsion is made of a mixture of raw materials at the following mass ratios: 20 to 110 parts by weight of a protamine, 10 to 60 parts by weight of a tea saponin, 0.1 to 5 parts by weight of a polysorbate-80, and 1000 to 1500 parts by weight of deionized water.

The described initiator is azobisisobutyronitrile.

Further, the described epoxy resin polyols may be made by refluxing and mixing the bisphenol A epoxy resin with epoxy value equal to 0.44 and diethylamine at a mass ratio of 100:30 to 100:34.

Further, the described acrylate monomer may be methyl acrylate, ethyl acrylate, a 2-methyl methacrylate or a 2-methyl methacrylate.

Further, the described graphene oxide-protamine composite emulsion may be made of a mixture of raw materials at the following mass ratios: 7 to 15 parts by weight of the graphene oxide, 1000 to 1500 parts by weight of the protamine emulsion, 20 to 45 parts by weight of the glutaraldehyde aqueous solution at the mass concentration of 50%, and 14 to 23 parts by weight of the concentrated sulfuric acid at the mass concentration of 98%.

Further, the described protamine emulsion may be made of a mixture of raw materials at the following mass ratios: 50 to 110 parts by weight of the protamine, 27 to 60 parts by weight of the tea saponin, 0.7 to 3 parts by weight of the polysorbate-80, and 1000 to 1500 parts by weight of the deionized water.

Further, the described solvent-free and composite film-forming resin emulsion may be made of raw materials at the following mass ratios: 1350 to 1420 parts by weight of the polyurethane monomer, 1000 parts by weight of the polyether glycol, 280 to 310 parts by weight of the alcohol chain extender, 170 to 185 parts by weight of the hydrophilic chain extender, 280 to 320 parts by weight of the epoxy resin polyols, 128 to 135 parts by weight of the triethylamine, 500 to 580 parts by weight of the acrylate monomer, 1280 to 1310 parts by weight of the graphene oxide-protamine composite emulsion, and 10 to 12 parts by weight of the initiator.

Furthermore, the described solvent-free and composite film-forming resin emulsion may be made of raw materials at the following mass ratios: 1350 to 1420 parts by weight of the toluene diisocyanate, 1000 parts by weight of the polyether diol having a molecular weight of 2000, 280 to 310 parts by weight of the 1,4-Butanediol, 170 to 185 parts by weight of the dimethylolpropionic acid, 280 to 320 parts by weight of the epoxy resin polyols, 128 to 135 parts by weight of the triethylamine, 500 to 580 parts by weight of a methyl acrylate monomer, 1280 to 1310 parts by weight of the graphene oxide-protamine composite emulsion, and 10 to 12 parts by weight of azobisisobutyronitrile acetone.

The described epoxy resin polyols may be made by refluxing and mixing the bisphenol A epoxy resin with epoxy value equal to 0.44 and the diethylamine at the mass ratio of 100:30 to 100:34.

The described graphene oxide-protamine composite emulsion may be made of a mixture of raw materials at the following mass ratios: 7 to 15 parts by weight of the graphene oxide, 1000 to 1500 parts by weight of the protamine emulsion, 25 to 45 parts by weight of the glutaraldehyde aqueous solution at the mass concentration of 50%, and 14 to 23 parts by weight of the concentrated sulfuric acid at the mass concentration of 98%. The protamine emulsion may be made of a mixture of raw materials at the following mass ratios: 50 to 105 parts by weight of the protamine, 27 to 60 parts by weight of the tea saponin, 0.7 to 3 parts by weight of the polysorbate-80, and 1000 to 1500 parts by weight of the deionized water.

Further, the described solvent-free and composite film-forming resin emulsion is prepared according to the following method:
(1) the protamine emulsion: according to a formula amount, mixing the protamine, the tea saponin, the Tween (80) with the deionized water, and shearing and emulsifying for 5 to 10 min (prefer 7 min) at 3000 to 4000 rpm at room temperature (25° C. to 30° C. ° C.) to obtain the protamine emulsion;
(2) the graphene oxide-protamine composite emulsion: according to the formula amount, mixing the graphene oxide with the protamine emulsion in Step (1), and shearing and emulsifying at 3000 to 4000 rpm for 10 to 15 min at room temperature, and adding the glutaraldehyde aqueous solution at the mass concentration of 50% and the concentrated sulfuric acid at the mass concentration of 98% according to the formula amount, and stirring and reacting at a constant temperature of 30° C. for 1 to 4 h (prefer 2.5 h) to obtain the graphene oxide-protamine composite emulsion;
(3) the epoxy resin polyols: according to the formula amount, having the epoxy resin and the diethylamine refluxing, stirring and reacting at 65° C. to 75° C. for 3 to 6 h (a preferable reaction temperature is 70° C. and a reaction time is 4.5 h to 5 h) to obtain the epoxy resin polyols;
(4) epoxy polyurethane prepolymer emulsion: under a protection of nitrogen, mixing the polyurethane monomer and the polyether glycol according to the formula amount thoroughly, after stirring and reacting at a constant temperature of 80° C. for 2 h, cooling the temperature to 65° C., and adding the alcohol chain extender of the formula amount to react for 1 h; then adding the hydrophilic chain extender of two-thirds of the formula amount, and raising the temperature to 70° C. to react for 1.5 h; and then add the hydrophilic chain extender of the remaining one-third of the formula amount and the epoxy resin polyols of the formula amount prepared in Step (3), and reacting at 70° C. for 3 h to obtain the epoxy polyurethane prepolymer emulsion; and
(5) the solvent-free and composite film-forming resin emulsion: under the protection of nitrogen, after cooling a temperature of the epoxy polyurethane prepolymer emulsion in Step (4) to room temperature (prefer 25° C. to 30V), adding triethylamine of the formula amount, after stirring thoroughly, adding the acrylate monomer according to the formula amount, shearing and emulsifying at 3000 rpm to 4000 rpm at 25° C. to 30° C. for 20 min, and slowly adding the graphene oxide-protamine composite emulsion of the formula amount during an emulsification process, after an amine chain extension reaction is complete, raising a temperature of a reaction solution to 70° C. to 75° C. and dropping an initiator of the formula amount evenly within 3 h, raising the temperature to 80° C. and keeping warm for 1 h to 2 h, and cooling to room temperature to obtain the solvent-free and composite film-forming resin emulsion.

The present invention further provides an application of the solvent-free and composite film-forming resin emulsion to prepare anti-fouling and anti-corrosion marine steel surface coating. The coating is made of a mixture of raw materials at the following mass ratios: 60 parts by weight of the solvent-free and composite film-forming resin emulsion, 20 parts by weight of pigments and fillers, 10 parts by weight of an assistant, and 10 parts by weight of the deionized water. The pigments and fillers are composed of titanium dioxide, talcum powder, a bentonite and iron oxide red at a mass ratio of 2:4:6:1. The assistant is composed of a multi-functional assistant AMP-95, a film-forming agent AD-82 and a dispersing agent AD-29 from Guangzhou An Di Chemical Co., Ltd. at a mass ratio of 5:3:2.

The protamine of the present invention refers to a food bacteria inhibiting additive, CAS: 9012-00-4.

The tea saponin of the present invention refers to an emulsifier, CAS: 8047-15-2.

The graphene oxide described in the present invention is prepared by a Hummers method: after mixing the concentrated sulfuric acid at a mass concentration of 98% and a sodium nitrate, and the ice bath cooled to 0° C., stirring and adding graphite, and mixing thoroughly. Slowly adding potassium permanganate at 0 to 4° C., the mixture and the container are then placed in a thermostatic water bath at 35° C. Stir until the temperature of the reaction system raise to 30° C., and keep the reaction for 2 h. Then add deionized water a, and stir until the temperature of the reaction system raise to 95° C., and keep the reaction for 15 min. Subsequently, add deionized water b and add a hydrogen peroxide solution at a mass concentration of 30% simultaneously, and the reaction is terminated when a dark brown solution changes to bright tan. Filter while hot, and wash with dilute hydrochloric acid at a volume ratio of 1:10, then vacuum dry at 60° C., and then take out and wash with distilled water fully, and vacuum dry at 60° C. again. Grind into powder after drying, and sieve with a 300 mesh sieve to obtain the graphene oxide, and a mass ratio of the concentrated sulfuric acid, the sodium nitrate, the graphite, the potassium permanganate, the deionized water a, the deionized water b, the hydrogen peroxide and the dilute hydrochloric acid is 460: 10:20:60:920:2800:100:20000.

Compared with the prior art, the beneficial effects of the present invention are mainly in the following descriptions:
(1) Waterborne polyurethane is a basic resin for an environment-friendly anti-corrosion coating, which dissolves or disperses the polyurethane with water instead of organic solvent. The modification of epoxy resin can improve a cross-linking degree of the resin, and greatly improve the coating performance, so as to meet requirements of marine climate anti-corrosion, and the modification of the acrylate can improve water resistance and weather resistance ability of the resin, which has the advantages of both acrylate and polyurethane.
(2) Graphene uses an edge of a sharp slice layer to destroy a cell membrane of the bacteria, to induce a cytoplasm outflows, which results in bacterial death. The graphene is called a physical "antibiotic" without drug resistance. Protamine is a polycationic non-toxic natural peptide with a good bacteria inhibiting activity. The protamine can obviously inhibit Gram-positive bacteria, Gram-negative bacteria, yeasts and molds, and also has a certain inhibitory effect on *Bacillus subtilis, Bacillus licheniformis* and *Bacillus megaterium*. The protamine-graphene composite product replaces the conventional amine chain extender, and an introduction of the protamine-graphene composite product into an epoxy-acrylate-polyurethane composite resin system not only improves comprehensive performance of the resin such as mechanical properties, chemical drug resistance, but also gives the resin a certain bacteria inhibiting and attachment inhibiting functions.
(3) Protamine-graphene-epoxy-acrylate-polyurethane composite film-forming resin emulsion is a solvent-free emulsion. The film-forming resin has functions of both anti-fouling and anti-corrosion. An bacteria inhibiting rate reaches as high as more than 80%, and an algae inhibiting rate reaches as high as 75%. The emulsion is used in the production of the green environmental marine coating, and protects the marine steel structure surface from the organism attachment and sea water corrosion.

DETAILED DESCRIPTION OF THE INVENTION

The present invention will be further described combining with specific embodiments below, but a protective scope of the present invention is not limited thereto:

The protamine of the present invention refers to a food bacteria inhibiting additive, CAS: 9012-00-4.

The tea saponin of the present invention refers to an emulsifier, CAS: 8047-15-2.

The graphite of the present invention is purchased from Qingdao Xinghe Graphite Co., Ltd., and carbon content is higher than 99%.

The pigments and fillers of the present invention are composed of the titanium dioxide, the talcum powder, the bentonite and the iron oxide red at a mass ratio of 2:4:6:1. The assistant of the present invention is composed of the multi-functional assistant AMP-95, the film-forming agent AD-82 and the dispersing agent AD-29 from Guangzhou An Di Chemical Co., Ltd. at the mass ratio of 5:3:2.

The preparation method of the graphene oxide described in the present invention is as follows: after mixing 460 g of the concentrated sulfuric acid at the mass concentration of 98% and 10 g of the sodium nitrate, and the ice bath cooled to 0° C., stirring and adding 20 g of the graphite, and mixing thoroughly. Slowly add 60 g of the potassium permanganate, and the temperature is controlled at 0 to 4° C. The mixture and the container are then placed in the thermostatic water bath at 35° C., and stir until the temperature of the reaction system raise to 30° C., and keep the reaction for 2 h. Then add a large amount of 920 g of the deionized water, and stir until the temperature of the reaction system raise to 95° C., and keep the reaction for 15 min. Subsequently, add 2800 g of the deionized water b and add 100 g of the hydrogen peroxide solution at the mass concentration of 30% simultaneously, and the reaction is terminated when the dark brown solution changes to the bright tan. Filter while hot, and wash with the dilute hydrochloric acid (mass concentration 3.6%, 20000 g) at the volume ratio of 1:10, then vacuum dry at 60° C. Grind into powder, and sieve with the 300 mesh sieve to obtain the graphene oxide for a spare.

The room temperature of embodiments in the present invention refers to 25° C. to 30° C.

Embodiment 1

(1) Protamine emulsion. Protamine 68 g, tea saponin 27 g, Tween (80) 0.7 g, and deionized water 1350 g. Shear and emulsify at 3500 rpm at room temperature for 7 min at a high speed to obtain approximately 1400 g of the protamine emulsion, and put the protamine emulsion in the refrigerator at 4° C. for a spare.

(2) Graphene oxide-protamine composite emulsion. Mix 7 g of graphene oxide with 1350 g of the protamine emulsion in Step (1), and shear and emulsify at 3500 rpm at 30° C. for 15 min at a high speed. Then add 23 g of a glutaraldehyde aqueous solution at a mass concentration of 50% and 14 g of concentrated sulfuric acid at a mass concentration of 98%, and stir and react at 30° C. for 2.5 h for cross-linking to obtain the graphene oxide-protamine composite emulsion. The reaction is airtight, and the quality is basically not lost.

(3) Epoxy resin polyols. Reflux, stir and react 230 g of bisphenol A epoxy resin (E-44, average molecular weight 3100 to 7000) with 74 g of diethylamine at 70° C. for 5 h after mixing thoroughly to obtain the epoxy resin polyols. The reaction is airtight, and the quality is basically not lost.

(4) Epoxy polyurethane prepolymer emulsion. Under a protection of nitrogen, mix 1400 g of toluene diisocyanate and polyether diol having a molecular weight of 2000 (1000 g) thoroughly. After stirring and reacting at 80° C. for 2 h, cool the temperature to 65° C., and add 300 g of 1,4-Butanediol to react for 1 h. Subsequently, add 120 g of a dimethylolpropionic acid, and raise the temperature to 70° C. to react for 1.5 h. Then add 60 g of the dimethylolpropionic acid and 300 g of the epoxy resin polyols in Step (3), and chain extension react at 70° C. for 3 h to obtain the epoxy polyurethane prepolymer emulsion.

(5) Keep on passing nitrogen, and cool a temperature of the epoxy polyurethane prepolymer emulsion in Step (4) to room temperature. After adding 130 g of triethylamine and stirring thoroughly, add 550 g of methyl acrylate. Shear and emulsify at 3500 rpm for 20 min at a high speed, and slowly add 1300 g of the graphene oxide-protamine composite emulsion in Step (2) during an emulsification process simultaneous. After an amine chain extension reaction is complete, a protamine-graphene-epoxy-polyurethane embedding methyl acrylate monomer seed emulsion is obtained.
(6) Keep on passing nitrogen, raise a temperature of the protamine-graphene-epoxy-polyurethane embedding methyl acrylate monomer seed emulsion to 70° C. to 75, and drop 10 g of azobisisobutyronitrile evenly within 3 h. Then raise the temperature to 80° C. and keep warm for 2 h. After cooling to room temperature, a protamine-graphene-epoxy-acrylate-polyurethane composite resin is obtained, and approximately 5000 g of the solvent-free type composite film-forming resin emulsion is obtained.
(7) Take 4800 g of the solvent-free and composite film-forming resin emulsion, 1600 g of the pigments and fillers mixture (made of a mixture of titanium dioxide, talcum powder, bentonite and iron oxide red at a mass ratio of 2:4:6:1), 800 g of the assistant mixture (made of a mixture of multi-functional assistantAMP-95, film-forming agent AD-82 and dispersing agent AD-29 at a mass ratio of 5:3:2), and 800 g of the deionized water. Mix and stir for 30 min, then treat with ultrasound for 20 min, and 8000 g of a green organism anti-fouling and anti-corrosion coating is made.

Embodiment 2

(1) Protamine emulsion. Protamine 20 g, tea saponin 10 g, Tween (80) 0.1 g, and deionized water 1000 g. Shear and emulsify at 3000 rpm at room temperature for 5 min at a high speed to obtain approximately 1000 g of the protamine emulsion, and put the protamine emulsion in the refrigerator at 4° C. for a spare.
(2) Graphene oxide-protamine composite emulsion. Mix 1 g of graphene oxide with 1000 g of the protamine emulsion in Step (1), and shear and emulsify at 3000 rpm at 30° C. for 10 min at a high speed. Then add 10 g of a glutaraldehyde aqueous solution at the mass concentration of 50% and 5 g of concentrated sulfuric acid at the mass concentration of 98%, and stir and react at 30° C. for 1 h for cross-linking to obtain the graphene oxide-protamine composite emulsion. The reaction is airtight, and the quality is basically not lost.
(3) Epoxy resin polyols. Reflux, stir and react 180 g of bisphenol A epoxy resin (E-44, average molecular weight 3100 to 7000) and 45 g of diethylamine at 75° C. for 3 h after mixing thoroughly to obtain the epoxy resin polyols. The reaction is airtight, and the quality is basically not lost.
(4) Epoxy polyurethane prepolymer emulsion. Under a protection of nitrogen, mix 1100 g of toluene diisocyanate and polyether diol having a molecular weight of 2000 (1000 g) thoroughly. After stirring and reacting at a constant temperature of 80° C. for 2 h, cool the temperature to 65° C., and add 200 g of hexalene glycol to react for 1 h. Subsequently, add 66 g of a dimethylolpropionic acid, and raise the temperature to 70° C. to react for 1.5 h. Then add 34 g of the dimethylolpropionic acid and 200 g of the epoxy resin polyols in Step (3), and chain extension react at 70° C. for 3 h to obtain the epoxy polyurethane prepolymer emulsion.
(5) Keep on passing nitrogen, cool a temperature of the epoxy polyurethane prepolymer emulsion in Step (4) to room temperature. After adding 100 g of triethylamine and stirring thoroughly, add 400 g of ethyl acrylate. Shear and emulsify at 3500 rpm for 20 min at a high speed, and slowly add 1000 g of the graphene oxide-protamine composite emulsion in Step (2) during an emulsification process simultaneous, after an amine chain extension reaction is complete, a protamine-graphene-epoxy-polyurethane embedding ethyl acrylate monomer seed emulsion is obtained.
(6) Keep on passing nitrogen, and raise a temperature of the protamine-graphene-epoxy-polyurethane embedding ethyl acrylate monomer seed emulsion to 70° C. to 75° C., and drop 5 g of azobisisobutyronitrile evenly within 3 h. Then raise the temperature to 80° C. and keep warm for 1.5 h. After cooling to room temperature, a protamine-graphene-epoxy-acrylate-polyurethane composite resin is obtained, and approximately 4000 g of the solvent-free type composite film-forming resin emulsion is obtained.
(7) Take 3960 g of the solvent-free type composite film-forming resin emulsion, 1320 g of the pigments and fillers mixture (same as Embodiment 1), 660 g of the assistant mixture (same as Embodiment 1), and 660 g of the deionized water. Mix and stir for 30 min, then treat with ultrasound for 20 min, and 6600 g of a green organism anti-fouling and anti-corrosion coating is made.

Embodiment 3

(1) Protamine emulsion. Protamine 105 g, tea saponin 60 g, Tween (80) 3 g, and deionized water 1500 g. Shear and emulsify at 4000 rpm at room temperature for 10 min at a high speed to obtain approximately 1600 g of the protamine emulsion, and put the protamine emulsion in the refrigerator at 4° C. for a spare.
(2) Graphene oxide-protamine composite emulsion. Mix 14 g of graphene oxide with 1600 g of the protamine emulsion in Step (1), and shear and emulsify at 4000 rpm at 30° C. for 15 min at a high speed. Then add 42 g of a glutaraldehyde aqueous solution at the mass concentration of 50% and 21 g of concentrated sulfuric acid at the mass concentration of 98%, and stir and react at 30° C. for 4 h for cross-linking to obtain the graphene oxide-protamine composite emulsion. The reaction is airtight, and the quality is basically not lost.
(3) Epoxy resin polyols. Reflux, stir and react 290 g of bisphenol A epoxy resin (E-44, average molecular weight 3100 to 7000) and 130 g of diethylamine at 75° C. for 3 h after mixing thoroughly to obtain the epoxy resin polyols. The reaction is airtight, and the quality is basically not lost.
(4) Epoxy polyurethane prepolymer emulsion. Under a protection of nitrogen, mix 1500 g of toluene diisocyanate and polyether diol having a molecular weight of 2000 (1000 g) thoroughly. After stirring and reacting at a constant temperature of 80° C. for 2 h, cool the temperature to 65° C., and add 400 g of neopentyl glycol to react for 1 h. Subsequently, add 167 g of a dimethylolbutanoic acid, and raise the temperature to 70° C. to react for 1.5 h. Then add 83 g of the dimethylolbutanoic acid and 400 g of the epoxy resin polyols in Step (3), and chain extension react at 70° C. for 3 h to obtain the epoxy polyurethane prepolymer emulsion.

(5) Keep on passing nitrogen, and cool a temperature of the epoxy polyurethane prepolymer emulsion in Step (4) to room temperature. After adding 150 g of triethylamine and stirring thoroughly, add 1000 g of 2-ethyl methacrylate. Shear and emulsify at 3500 rpm for 20 min at a high speed, slowly add 1500 g of the graphene oxide-protamine composite emulsion in Step (2) during an emulsification process simultaneous. After an amine chain extension reaction is complete, a protamine-graphene-epoxy-polyurethane embedding 2-ethyl methacrylate monomer seed emulsion is obtained.

(6) Keep on passing nitrogen, and raise a temperature of the protamine-graphene-epoxy-polyurethane embedding 2-ethyl methacrylate monomer seed emulsion to 70° C. to 75° C., and drop 20 g of azobisisobutyronitrile evenly within 3 h. Then raise the temperature to 80° C. and keep warm for 1.5 h. after cooling to room temperature, a protamine-graphene-epoxy-acrylate-polyurethane composite resin is obtained, and approximately 6000 g of the solvent-free type composite film-forming resin emulsion is obtained.

(7) Take 6000 g of the solvent-free type composite film-forming resin emulsion, 2000 g of the pigments and fillers mixture (same as Embodiment 1), 1000 g of the assistant mixture (same as Embodiment 1), and 1000 g of the deionized water, mix and stir for 30 min, then treat with ultrasound for 20 min, and 10000 g of a green organism anti-fouling and anti-corrosion coating is made.

(3) Pass nitrogen, and cool a temperature of the epoxy polyurethane prepolymer emulsion to room temperature. After adding 130 g of triethylamine and stirring thoroughly, add 550 g of methyl acrylate. Shear and emulsify at 3500 rpm for 20 min at a high speed, and slowly add 1300 g of deionized water during an emulsification process. After an amine chain extension reaction is complete, an epoxy-polyurethane embedding methyl acrylate monomer seed emulsion is obtained.

(4) Keep on passing nitrogen, and raise a temperature of the epoxy-polyurethane embedding methyl acrylate monomer seed emulsion to 70° C. to 75° C., and drop 10 g of azobisisobutyronitrile evenly within 3 h. Then raise the temperature to 80° C. and keep warm for 2 h. After cooling to room temperature, an epoxy-acrylate-polyurethane composite resin is obtained, which is 5190 g of the solvent-free and composite film-forming resin emulsion.

(5) Take 5100 g of the solvent-free and composite film-forming resin emulsion, 1700 g of the pigments and fillers mixture (same as Embodiment 1), 850 g of the assistant mixture (same as Embodiment 1), and 850 g of the deionized water, mix and stir for 30 min, then treat with ultrasound for 20 min, and 8500 g of a green organism anti-fouling and anti-corrosion coating is made.

Embodiment 5

Take Embodiment 4 as a control. The coatings obtained from Embodiment 1-3 and Embodiment 4 are applied to the steel plate for performance test, and the results are shown in Table 1 as below:

TABLE 1

| | Experiment method | Embodiment 1 | Embodiment 2 | Embodiment 3 | Embodiment 4 (control) |
|---|---|---|---|---|---|
| Adhesion (pull-off test) MPa | GB/T5210-2006 | 19.8 | 18.1 | 17.5 | 14.4 |
| Salt spray resistance (3000 h) | GB/T1771-2007 | The coating film is intact | The coating film is intact | The coating film is intact | A small amount is blistered and corroded |
| 10% NaOH resistance (30 d) | GB/T9274-1988 | The coating film is intact | The coating film is intact | The coating film is intact | The coating film is intact |
| Artificial sea water resistance (40° C., 4200 h) | GB/T9274-1988 | The coating film is intact | The coating film is intact | The coating film is intact | A small amount is blistered and corroded |

It can be seen from above results that the coatings provided by the present invention have excellent mechanical properties and chemical drug corrosion resistance property.

Embodiment 4

(1) Epoxy resin polyols. Reflux, stir and react 230 g of bisphenol A epoxy resin (E-44) and 74 g of diethylamine at 70° C. for 5 h after mixing thoroughly to obtain 304 g of the epoxy resin polyols.

(2) Epoxy polyurethane prepolymer emulsion. Under a protection of nitrogen, mix 1400 g of toluene diisocyanate and polyether diol having a molecular weight of 2000 (1000 g) thoroughly. After reacting at 80° C. for 2 h, cool the temperature to 65° C., and add 300 g of 1,4-Butanediol to react for 1 h. Subsequently, add 120 g of a dimethylolpropionic acid, and raise the temperature to 70° C. to react for 1.5 h. Then add 60 g of the dimethylolpropionic acid and 300 g of the epoxy resin polyols in Step (1), and chain extension react at 70° C. for 3 h to obtain the epoxy polyurethane prepolymer emulsion.

Embodiment 6

Preparation of sterile seawater. After filtering the seawater through a glass sand core funnel, the sea water is sterilized at 121° C. for 20 min for a spare.

Bacteria culture. A sample from an attachment to a bottom of a hull is diluted by a certain amount of sterile seawater. The supernatant is taken and inoculated on a pre-numbered plate medium (2216E solid medium) by a spread method, and the plate medium is placed in a 25° C. incubator to incubate for 3-5 days. Observe, separate and purify it, and then inoculate it on a slant (2216E solid medium). Liquid seals it with glycerol, and preserves it at a low temperature.

Liquid medium. Stopper a beaker full of 1 L of sterile seawater, 5 g of peptone, 1 g of yeast extract, and 0.11 g of iron (III) chloride with kraft paper to seal an opening, and sterilize the beaker at 121° C. for 20 min. After the beaker is cooled, the liquid is distributed to sterile conical flasks under sterile condition. Preserve the sterile conical flasks under sterile condition for a spare.

Preparation of eluent: use sterile seawater.

Preparation of a bacteria suspension. Take 1 ring of each strains preserved on the slant, and inoculate it in 50 mL of liquid medium under condition of 25° C. and 180 r/min to continuously incubate for 6 h. Select the suspension with $OD_{620\ nm}$ value between 0.1 to 0.6 for a spare.

Test of hanging iron plate. In 6 glass jars, add 10 L of sterile seawater and 1 mL of each tested bacteria suspensions after incubating for 6 h. The temperature is maintained at 25° C. After incubating for 6 h, a dried iron plate coated with the coating (a solvent-free and composite film-forming resin emulsion prepared in Embodiment 1-4) (coating film thickness: 1 mm) is placed in the glass jar for continuously incubating for 24 h. Take out the glass plate, and rinse it with liquid medium. A rinsing solution is placed in a 100 mL volumetric flask for a constant volume. Measure $OD_{620\ nm}$ value of the rinsing solution, and calculate it by a formula of bacteria inhibiting rate=$(1-OD_{620\ nm}/OD_{620\ nmcontrol}) \times 100\%$, and the results are shown in Table 2 below:

TABLE 2

| Number | Embodiment 1 | Embodiment 2 | Embodiment 3 | Embodiment 4 (Control) |
|---|---|---|---|---|
| inhibiting bacteria rate (%) | 89.6% | 85.2% | 86.8% | / |

It can be seen from above results that the coatings provided by the present invention have an effect of inhibiting bacteria, and the bacteria inhibiting rate is as high as more than 80%.

Embodiment 7

1 L of natural seawater is filtered through a filtration membrane with 0.45 μm of a pore diameter, and the pH is adjusted to 8.0 through 1 mol/L NaOH or 1 mol/L HCl solution. Sterilize it at 121° C. for 20 min to prepare the sterile seawater.

Natural seawater (mainly containing *chlorella* and *nitzschia closterium*) is filtered through the glass sand core funnel. After boiling, sterilizing and cooling, an f/2 algae incubation concentrate (Shanghai Guangyu Biotechnology Co., Ltd. GY-M20-50) is diluted 1000 times to obtain an f/2 algae incubation solution.

The f/2 algae incubation solution is distributed into 100 mL conical flasks. Seal the conical flasks with multiple layers of gauze, and transferred them into an artificial climate incubator (shaker light incubator ZDX-600). Continuously incubate under conditions of light intensity 2500 lx, temperature 20° C., aeration 3.0 L/min and light cycle 24:0 for a certain time. The $OD_{660\ nm}$ value of the f/2 algae incubation solution is measured by a microplate reader at any time, and an algal suspension with $OD_{660\ nm}$ value between 0.1 to 0.6 is selected.

In 6 glass jars, add 10 L of the sterile seawater and 5 mL of each selected algae suspension. A dried iron plate coated with the coating (a solvent-free and composite film-forming resin emulsion prepared in Embodiment 1 to 4) (coating film thickness: 1 mm) is placed in the glass jar, and continuously incubate it under conditions of light intensity 2500 lx, temperature 20° C., aeration 3.0 L/min, light cycle 24:0 for 7 days. Take out the iron plate, rinse it with clean and sterile sea water repeatedly. All the algae attached to the iron plate is washed down, and the eluate washed down is adjusted to 25 mL using constant volume. Measure the $OD_{620\ nm}$ value by the microplate reader, and calculate it by a formula of inhibiting algae rate=$(1-OD_{620\ nm}/OD_{620\ nmcontrol}) \times 100\%$. The results are shown in Table 3 below:

TABLE 3

| Number | Embodiment 1 | Embodiment 2 | Embodiment 3 | Embodiment 4 (control) |
|---|---|---|---|---|
| inhibiting algae rate (%) | 85.1% | 79.5% | 78.6% | / |

It can be seen from above results that the coatings provided by the present invention have an effect of inhibiting algae, and the algae inhibiting rate is as high as more than 75%.

What is claimed is:

1. A solvent-free and composite film-forming resin emulsion, wherein the emulsion is made of raw materials at the following mass ratios: 1100 to 1500 parts by weight of a diisocyanate, 1000 parts by weight of polyether glycol, 200 to 400 parts by weight of an alcohol chain extender, 100 to 250 parts by weight of a hydrophilic chain extender, 200 to 400 parts by weight of epoxy resin polyols, 100 to 150 parts by weight of triethylamine, 400 to 1000 parts by weight of an acrylate monomer, 1000 to 1500 parts by weight of a graphene oxide-protamine composite emulsion, and 5 to 20 parts by weight of an initiator;
   the alcohol chain extender is ethylene glycol, 1,2-propanediol, 1,4-butanediol or neopentyl glycol; the hydrophilic chain extender is a dimethylolpropionic acid or a dimethylolbutanoic acid;
   the epoxy resin polyols is made by refluxing and mixing an epoxy resin and diethylamine at a mass ratio of 100:25 to 100:50;
   the graphene oxide-protamine composite emulsion is made of a mixture of raw materials at the following mass ratios: 1 to 15 parts by weight of graphene oxide, 1000 to 2000 parts by weight of a protamine emulsion, 10 to 50 parts by weight of a glutaraldehyde aqueous solution at a mass concentration of 50%, and 5 to 25 parts by weight of concentrated sulfuric acid at a mass concentration of 98%; the protamine emulsion is made of a mixture of raw materials at the following mass ratios: 20 to 110 parts by weight of a protamine, 10 to 60 parts by weight of a tea saponin, 0.1 to 5 parts by weight of a polysorbate-80, and 1000 to 1500 parts by weight of deionized water; and
   the initiator is azobisisobutyronitrile.

2. The solvent-free and composite film-forming resin emulsion according to claim 1, wherein the epoxy resin polyols is made by refluxing and mixing a bisphenol A epoxy resin with epoxy value equal to 0.44 and the diethylamine at a mass ratio of 100:30 to 100:34.

3. The solvent-free and composite film-forming resin emulsion according to claim 1, wherein the acrylate monomer is methyl acrylate, ethyl acrylate, or a 2-methyl methacrylate or a 2-methyl methacrylate.

4. The solvent-free and composite film-forming resin emulsion according to claim 1, wherein the graphene oxide-protamine composite emulsion is made of a mixture of raw materials at the following mass ratios: 7 to 15 parts by weight of the graphene oxide, 1000 to 1500 parts by weight of the protamine emulsion, 20 to 45 parts by weight of the glutaraldehyde aqueous solution at the mass concentration of 50%, and 14 to 23 parts by weight of the concentrated sulfuric acid at the mass concentration of 98%.

5. The solvent-free and composite film-forming resin emulsion according to claim 1, wherein the protamine emulsion is made of a mixture of raw materials at the following mass ratios: 50 to 110 parts by weight of the protamine, 27 to 60 parts by weight of the tea saponin, 0.7 to 3 parts by weight of the polysorbate-80, and 1000 to 1500 parts by weight of the deionized water.

6. The solvent-free and composite film-forming resin emulsion according to claim 1, wherein the emulsion is made of raw materials at the following mass ratios: 1350 to 1420 parts by weight of the diisocyanate, 1000 parts by weight of the polyether glycol, 280 to 310 parts by weight of the alcohol chain extender, 170 to 185 parts by weight of the hydrophilic chain extender, 280 to 320 parts by weight of the epoxy resin polyols, 128 to 135 parts by weight of the triethylamine, 500 to 580 parts by weight of the acrylate monomer, 1280 to 1310 parts by weight of the graphene oxide-protamine composite emulsion, and 10 to 12 parts by weight of the initiator.

7. The solvent-free and composite film-forming resin emulsion according to claim 1, wherein the emulsion is made of raw materials at the following mass ratios: 1350 to 1420 parts by weight of toluene diisocyanate, 1000 parts by weight of polyether diol having a molecular weight of 2000, 280 to 310 parts by weight of 1,4-butanediol, 170 to 185 parts by weight of dimethylolpropionic acid, 280 to 320 parts by weight of the epoxy resin polyols, 128 to 135 parts by weight of the triethylamine, 500 to 580 parts by weight of a methyl acrylate monomer, 1280 to 1310 parts by weight of the graphene oxide-protamine composite emulsion, and 10 to 12 parts by weight of azobisisobutyronitrile acetone;

the epoxy resin polyols is made by refluxing and mixing the bisphenol A epoxy resin with epoxy value equal to 0.44 and the diethylamine at the mass ratio of 100:30 to 100:34; and the graphene oxide-protamine composite emulsion is made of a mixture of raw materials at the following mass ratios: 7 to 15 parts by weight of the graphene oxide, 1000 to 1500 parts by weight of the protamine emulsion, 25 to 45 parts by weight of the glutaraldehyde aqueous solution at the mass concentration of 50%, and 14 to 23 parts by weight of the concentrated sulfuric acid at the mass concentration of 98%, and the protamine emulsion is made of a mixture of raw materials at the following mass ratios: 50 to 105 parts by weight of the protamine, 27 to 60 parts by weight of the tea saponin, 0.7 to 3 parts by weight of the polysorbate-80, and 1000 to 1500 parts by weight of the deionized water.

8. The solvent-free and composite film-forming resin emulsion according to claim 1, the emulsion being prepared according to the following method:
(1) the protamine emulsion: according to the parts by weight as claimed in claim 1, mixing the protamine, the tea saponin, the polysorbate-80 with the deionized water, and shearing and emulsifying for 5 to 10 min at 3000-4000 rpm at room temperature to obtain the protamine emulsion;
(2) the graphene oxide-protamine composite emulsion: according to the parts by weight as claimed in claim 1, mixing the graphene oxide with the protamine emulsion in Step (1), and shearing and emulsifying at 3000-4000 rpm for 10-15 min at room temperature, and adding the glutaraldehyde aqueous solution at the mass concentration of 50% and the concentrated sulfuric acid at the mass concentration of 98% according to the parts by weight as claimed in claim 1, and stirring and reacting at a constant temperature of 30° C. for 1 to 4 h to obtain the graphene oxide-protamine composite emulsion;
(3) the epoxy resin polyols: refluxing, stirring, and, reacting the epoxy resin and the diethylamine according to the parts by weight as claimed in claim 1 at 65° C. to 75° C. for 3 to 6 h to obtain the epoxy resin polyols;
(4) epoxy polyurethane prepolymer emulsion: under a protection of nitrogen, mixing the diisocyanate and the polyether glycol according to the parts by weight as claimed in claim 1 thoroughly, after reacting at 80° C. for 2 h, cooling the temperature to 65° C. and adding the alcohol chain extender of the parts by weight as claimed in claim 1 to react for 1 h; then adding the hydrophilic chain extender of two-thirds of the parts by weight as claimed in claim 1, and raising the temperature to 70° C. to react for 1.5 h; and then adding the hydrophilic chain extender of the remaining one-third of the parts by weight as claimed in claim 1 and the epoxy resin polyols prepared in Step (3) of the parts by weight as claimed in claim 1, and reacting at 70° C. for 3 h to obtain the epoxy polyurethane prepolymer emulsion; and
(5) the solvent-free and composite film-forming resin emulsion: under the protection of nitrogen, after cooling a temperature of the epoxy polyurethane prepolymer emulsion in Step (4) to room temperature, adding triethylamine of the parts by weight as claimed in claim 1, after stirring thoroughly, adding the acrylate monomer of the parts by weight as claimed in claim 1, shearing and emulsifying at 3000 to 4000 rpm at room temperature for 20 min, and slowly adding the graphene oxide-protamine composite emulsion of the parts by weight as claimed in claim 1 during an emulsification process, after an amine chain extension reaction is complete, raising the reaction solution temperature to 70° C. to 75° C. and dropping an initiator of the parts by weight as claimed in claim 1 evenly within 3 h, raising the temperature to 80° C. and keeping warm for 1 to 2 h, and cooling to room temperature to obtain the solvent-free and composite film-forming resin emulsion.

* * * * *